US011433829B2

(12) United States Patent
Tawada et al.

(10) Patent No.: US 11,433,829 B2
(45) Date of Patent: Sep. 6, 2022

(54) FITTING STRUCTURE

(71) Applicant: TOYOTA BOSHOKU KABUSHIKI KAISHA, Aichi (JP)

(72) Inventors: Kazuhiro Tawada, Aichi-ken (JP); Akihiro Kawashima, Aichi-ken (JP); Toshiya Tanizawa, Aichi-ken (JP); Takuya Yamaguchi, Aichi-ken (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 199 days.

(21) Appl. No.: 16/962,121

(22) PCT Filed: Dec. 28, 2018

(86) PCT No.: PCT/JP2018/048456
§ 371 (c)(1),
(2) Date: Jul. 14, 2020

(87) PCT Pub. No.: WO2019/142649
PCT Pub. Date: Jul. 25, 2019

(65) Prior Publication Data
US 2020/0346593 A1 Nov. 5, 2020

(30) Foreign Application Priority Data
Jan. 17, 2018 (JP) .............................. JP2018-005447

(51) Int. Cl.
*B60R 13/02* (2006.01)

(52) U.S. Cl.
CPC ...... *B60R 13/0243* (2013.01); *B60R 13/0206* (2013.01)

(58) Field of Classification Search
CPC .................. B60R 13/0206; B60R 13/0243
See application file for complete search history.

(56) References Cited

U.S. PATENT DOCUMENTS

| 4,212,415 A | * | 7/1980 | Neely | .................. | B65D 83/06 |
| | | | | | 222/231 |
| 5,699,601 A | * | 12/1997 | Gilliam | ................ | H05K 5/0013 |
| | | | | | 403/364 |

(Continued)

FOREIGN PATENT DOCUMENTS

| CN | 202867446 U | 4/2013 |
| CN | 203979052 U | 12/2014 |

(Continued)

OTHER PUBLICATIONS

Chinese Office Action in counterpart Chinese Patent Application No. 201880086565.2, dated Apr. 30, 2021 (along with English translation thereof).

(Continued)

*Primary Examiner* — D Glenn Dayoan
*Assistant Examiner* — Melissa Ann Bonifazi
(74) *Attorney, Agent, or Firm* — Greenblum & Bernstein, P.L.C.

(57) ABSTRACT

A fitting structure for fitting first and second members together includes a fitting projection and a receptacle. The fitting projection protrudes from a second member opposed surface of the first member opposed to the second member toward the second member. The receptacle protrudes from an opposite surface on an opposite side from the second member opposed surface in an opposite direction from the second member opposed surface and includes an internal receiving space. The receptacle includes a fitting portion, a supporting portion, and two slits. A section of an inner surface of the supporting portion is opposed to inner surface of the fitting portion. The slits are provided between two edges of the fitting portion and two edges of the supporting portion to communicate with the receiving space. The fitting (Continued)

projection includes a first section disposed in the receiving space and a second section fitted to the fitting portion.

20 Claims, 12 Drawing Sheets

(56) References Cited

U.S. PATENT DOCUMENTS

| | | | | |
|---|---|---|---|---|
| 7,360,964 | B2* | 4/2008 | Tsuya | F16B 5/0642 |
| | | | | 24/292 |
| 2005/0054229 | A1 | 3/2005 | Tsuya et al. | |
| 2012/0321379 | A1* | 12/2012 | Wang | F16B 5/0664 |
| | | | | 403/321 |

FOREIGN PATENT DOCUMENTS

| | | | |
|---|---|---|---|
| FR | 2974600 | A | 11/2012 |
| FR | 3003612 | A | 9/2014 |
| JP | H09-032822 | | 2/1997 |
| JP | 2005-098496 | | 4/2005 |
| JP | 2009-222108 | | 10/2009 |
| WO | WO2015/075918 | A | 5/2015 |

OTHER PUBLICATIONS

Australian Office Action in counterpart Australian Patent Application No. 2018402959, dated Apr. 1, 2021.

* cited by examiner

FITTING STRUCTURE

TECHNICAL FIELD

The technology described herein relates to a fitting structure.

BACKGROUND ART

A fitting structure for fitting a protrusion of a door panel in a recess of a door trim has been known. The fitting structure includes a hole in the door panel and a fitting projection on a door trim inserted in the hole. The fitting projection of the door trim is fitted to a section of an edge of the hole in the door panel opposed to the protrusion of the door panel. With the fitting structure, the protrusion of the door panel is fitted in the recess of the door trim. An example of such a fitting structure is described in Japanese Unexamined Patent Application Publication No. 2009-222108. With such a fitting structure, the door trim is stably attached to the door panel.

RELATED ART DOCUMENT

Patent Document

Patent Document 1: Japanese Unexamined Patent Application Publication No. 2009-222108

DISCLOSURE OF THE PRESENT INVENTION

Problem to be Solved by the Invention

Because the door panel has higher rigidity and less flexibility, a large force may be required to insert the fitting projection into the hole. To reduce the requirement of the force, a dimension of the fitting projection in a direction in which the fitting projection is inserted may be increased. However, it is preferable to design a space behind the door panel in which the fitting projection is disposed as small as possible. Therefore, the dimension of the projection in the direction in which the fitting projection is inserted cannot be increased. If a force is applied to the door trim in an opposite direction to the direction in which the fitting projection is inserted into the hole in the door panel and the fitting projection contacts the edge of the hole, the edge of the hole may be deformed in a direction away from the fitting projection. This may cause removal of the fitting projection from the door panel.

The technology described herein was made in view of the foregoing circumstances. An object is to provide a compact fitting structure to fit a component to another component without a large insertion force.

Means for Solving the Problem

A fitting structure for fitting a first member and a second member together includes a fitting projection and a receptacle. The fitting projection protrudes from a second member opposed surface of the first member opposed to the second member toward the second member. The receptacle protrudes from an opposite surface of the second member on an opposite side from the second member opposed surface in an opposite direction from the second member opposed surface. The receptacle includes an internal receiving space that communicates with a through hole in the second member. The receptacle includes a fitting portion, a supporting portion, and two slits. The fitting portion has a plate shape that protrudes from the opposite surface. The supporting portion protrudes from the opposite surface such that at least a section of an inner surface of the supporting portion is opposed to an inner surface of the fitting portion. The slits are provided between two edges of the fitting portion extending in a protruding direction in which the fitting portion protrudes and edges of the supporting portion adjacent to the edges of the fitting portion, respectively. The slits communicate with the receiving space. The receiving space is defined by the fitting portion and the supporting portion. The fitting projection includes a first section disposed in the receiving space and a second section fitted to the fitting portion.

In the fitting structure, the fitting portion is separated from the supporting portion by the slits. Therefore, the fitting portion can be easily warped. During insertion of the fitting projection into the receiving space, the fitting portion is pushed up by the fitting projection and thus the receiving space expands. The fitting projection can be easily inserted into the receiving space. Namely, in comparison to a fitting structure including a receptacle without slits, the fitting projection can be fitted to the fitting portion smaller force according to the above configuration. Further, the fitting portion is flexible and thus the fitting projection can be inserted into the receiving space with a smaller force without an increase in dimension of the fitting projection in a direction in which the fitting projection protrudes.

Advantageous Effect of the Invention

According to the technology described herein, a fitting structure in compact size and capable of fitting components together without a large force.

MODES FOR CARRYING OUT THE INVENTION

First Embodiment

A first embodiment will be described with reference to FIGS. 1 to 9.

Figure 1:
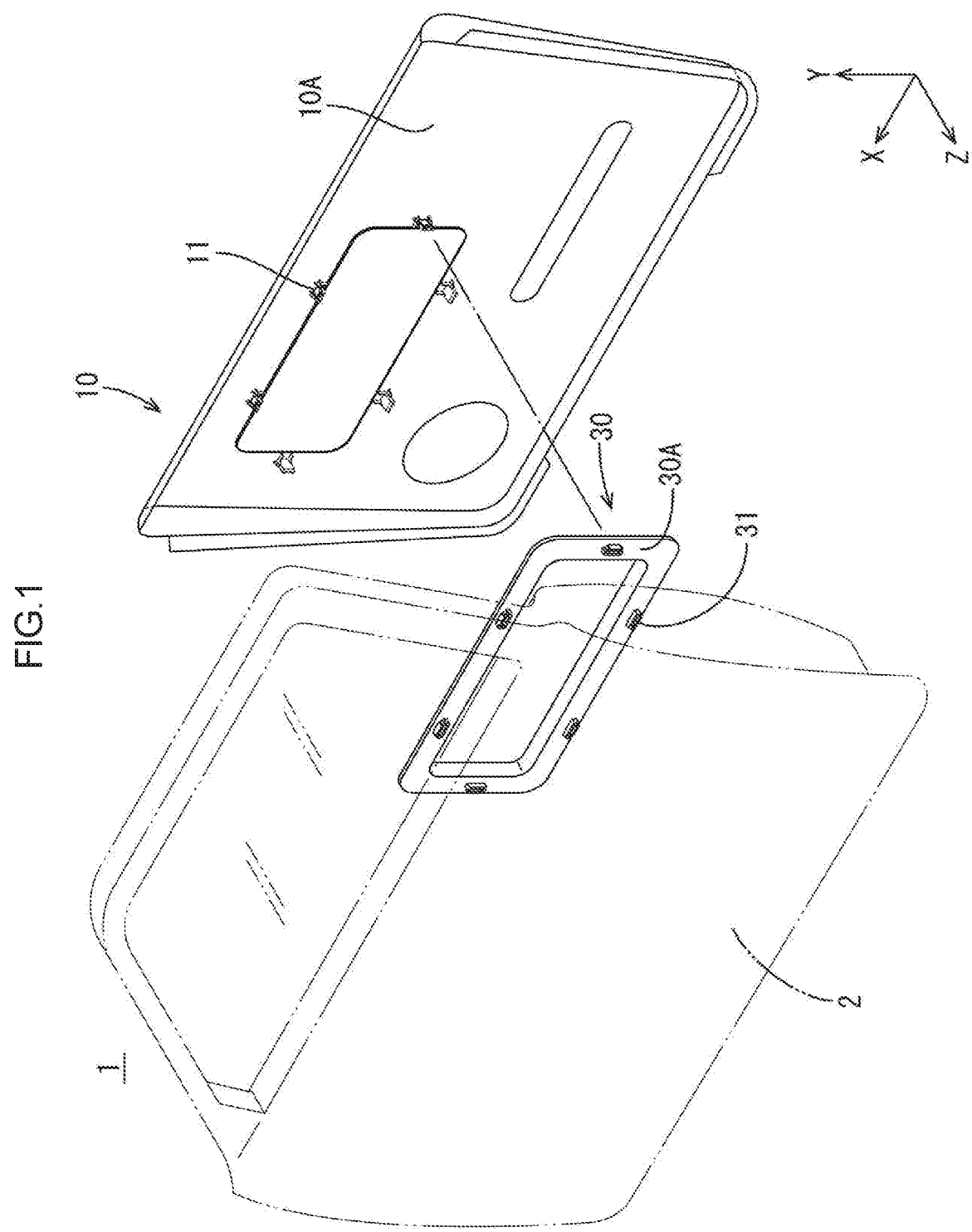
FIG. 1 is an exploded perspective view of a vehicle door according to a first embodiment.
Figure 2:
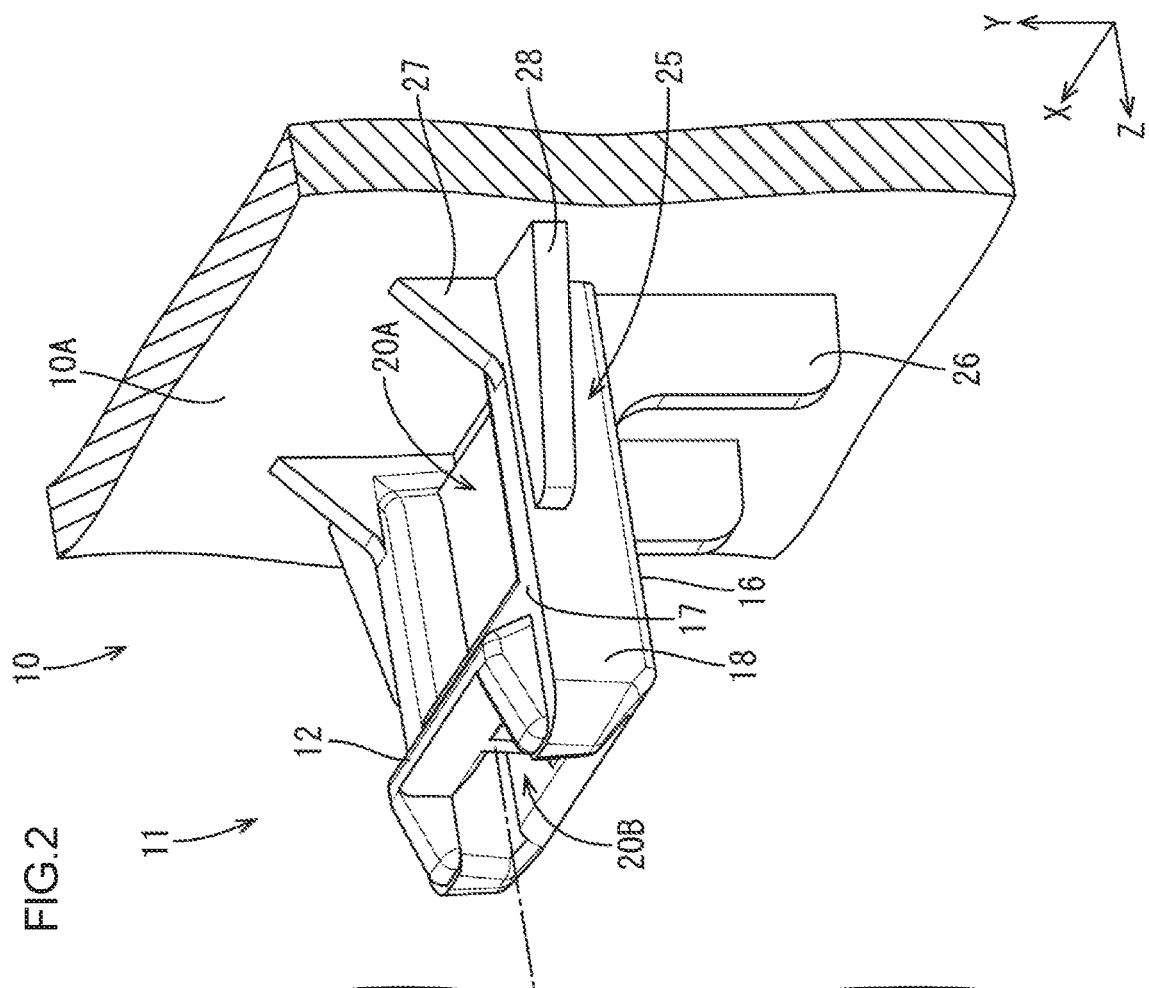
FIG. 2 is a perspective view illustrating a fitting projection and a receptacle.

As illustrated in FIG. 1, a vehicle door 1 includes a door panel 2, a door trim 10 (a first member), and an ornament 30 (a second member). The door trim 10 is installed to cover a lower inner surface of the door panel 2. The ornament 30 is attached to a back of the door trim 10 such that a section of the ornament 30 is exposed from a front of the door trim 10. The section of the ornament 30 constitutes a part of a design surface of the door trim 10. The door trim 10 includes fitting projections 11 that protrude from a hack surface 10A of the door trim 10 opposed to the ornament 30 (a second member opposed surface) in the Z-axis direction toward the ornament 30. As illustrated in FIGS. 1 and 2, the ornament 30 includes receptacles 31 that protrude from a back surface 30A (an opposite surface) located on an opposite side from the back surface 10A in an opposite direction from the back surface 10A. The receptacles 31 are located at positions corresponding to positions of the fitting projections 11. Each of the receptacles 31 includes an internal receiving space 34 for receiving the corresponding fitting projection 11. The ornament 30 includes through holes 34A at positions corresponding to receiving spaces 34. The through holes 34A communicate with the receiving spaces 34, respectively. The fitting projections 11 are inserted into the respective receiving spaces 34 through the respective through holes 34A. The fitting projections 11 are inserted into the respective receiving spaces 34 along the Z-axis direction.

Figure 5:
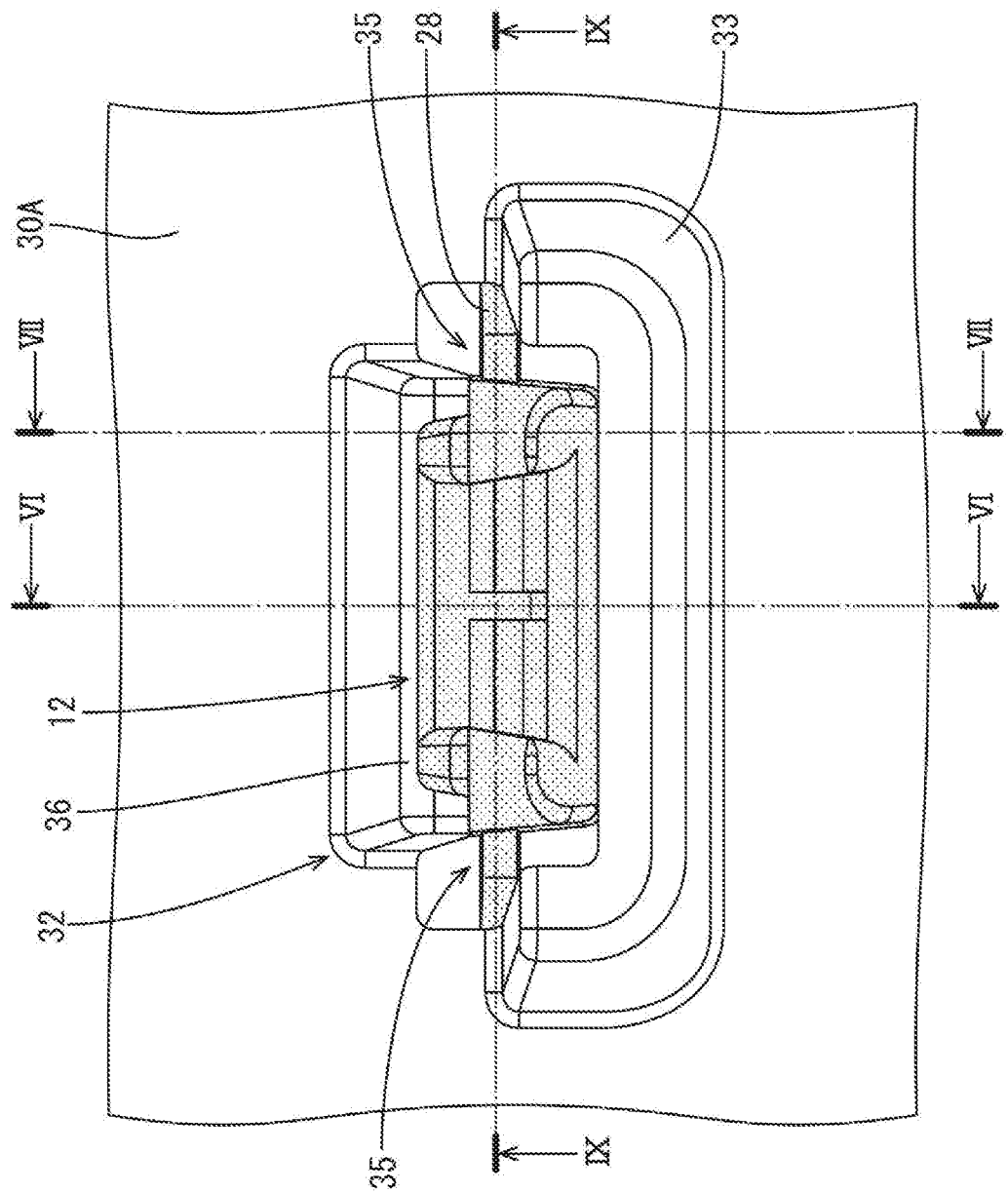
FIG. 5 is a view illustrating the receptacle and the fitting projection fitted to the receptacle.

As illustrated in FIGS. 2 and 5, the receptacles 31 include fitting portions 32, supporting portion 33, and slits 35. Each receptacle 31 includes two slits 35. Each fitting portion 32 has a plate shape that protrudes from the back surface 30A. The fitting portions 32 include base sections and distal ends 36. The base sections are connected with the hack surface 30A. The distal ends 36 are located on an opposite side from the base sections. The distal ends 36 include edges of the fitting portions 32 at ends in a protruding direction (distal end edges). Each supporting portion 33 has a U shape that is long in a width direction. The supporting portions 33 protrude from the hack surface 30A in the Z-axis direction such that at least a section of an inner surface of each supporting portion 33 is opposed to an inner surface of the corresponding fitting portion 32. The fitting portions 32 are separated from the respective supporting portions 33 in the Y-axis direction. The fitting portions 32 are sloped such that the distal ends 36 are more adjacent to the supporting portions 33 in comparison to the base sections. The receiving spaces 34 are defined by the fitting portions 32 and the supporting portions 33. The supporting portions 33 define about halves of the receiving spaces 34. The fitting portions 32 include first edges and second edges that extend in the protruding direction in which the fitting portions 32 protrude. The slits 35 are provided between the first edges and edges of the supporting portion 33 that are adjacent the first edges and between the second edges and edges of the supporting portions 33 that are adjacent to the second edges.

Figure 3:
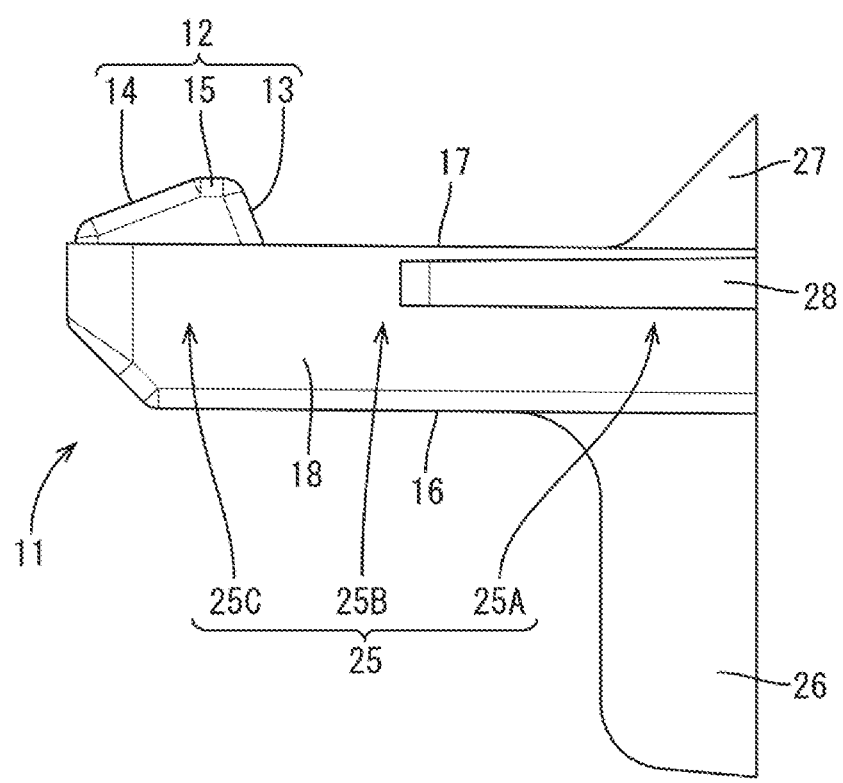
FIG. 3 is a side view of the fitting projection.
Figure 4:
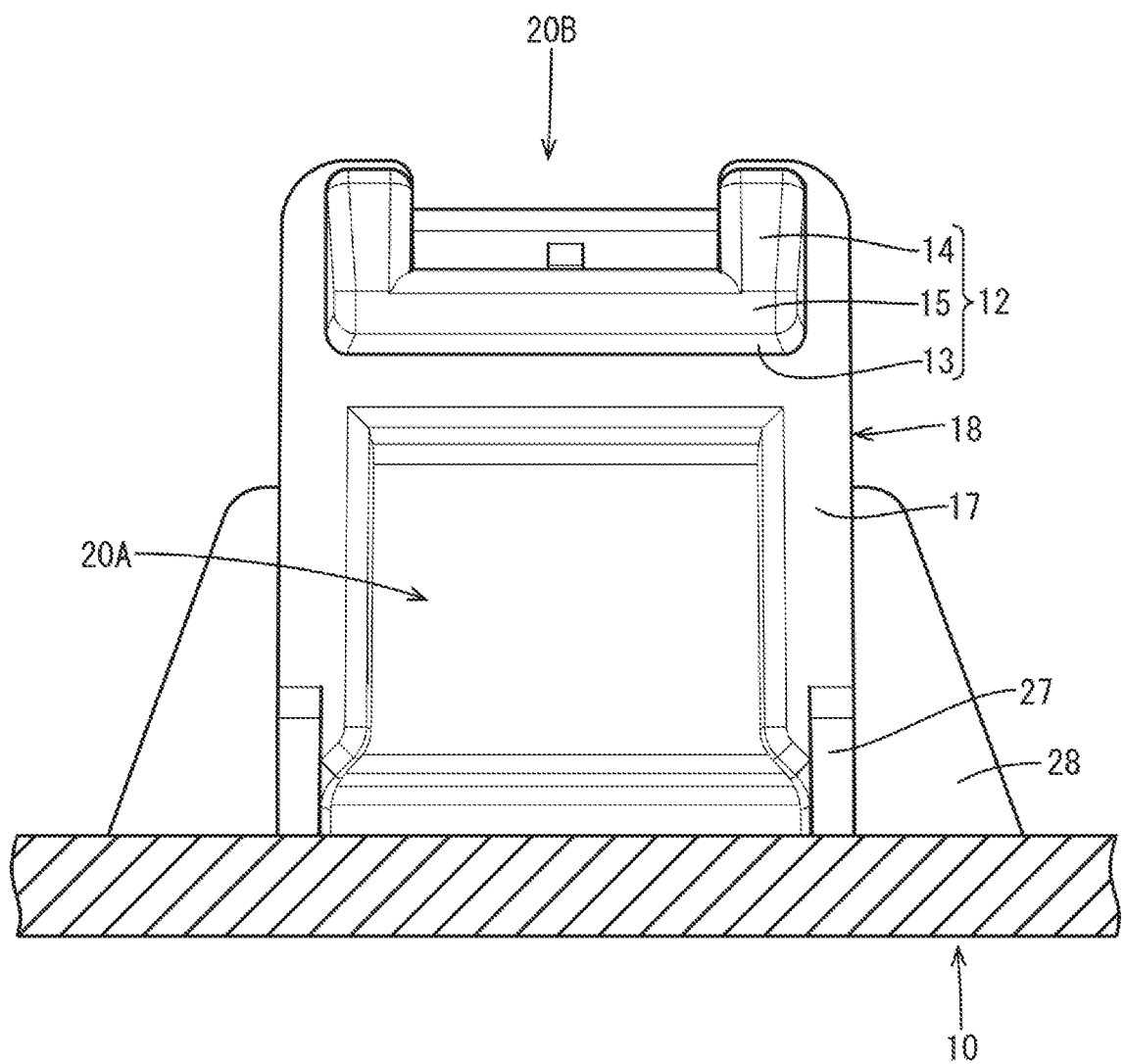
FIG. 4 is a top view of the fitting projection.
Figure 7:
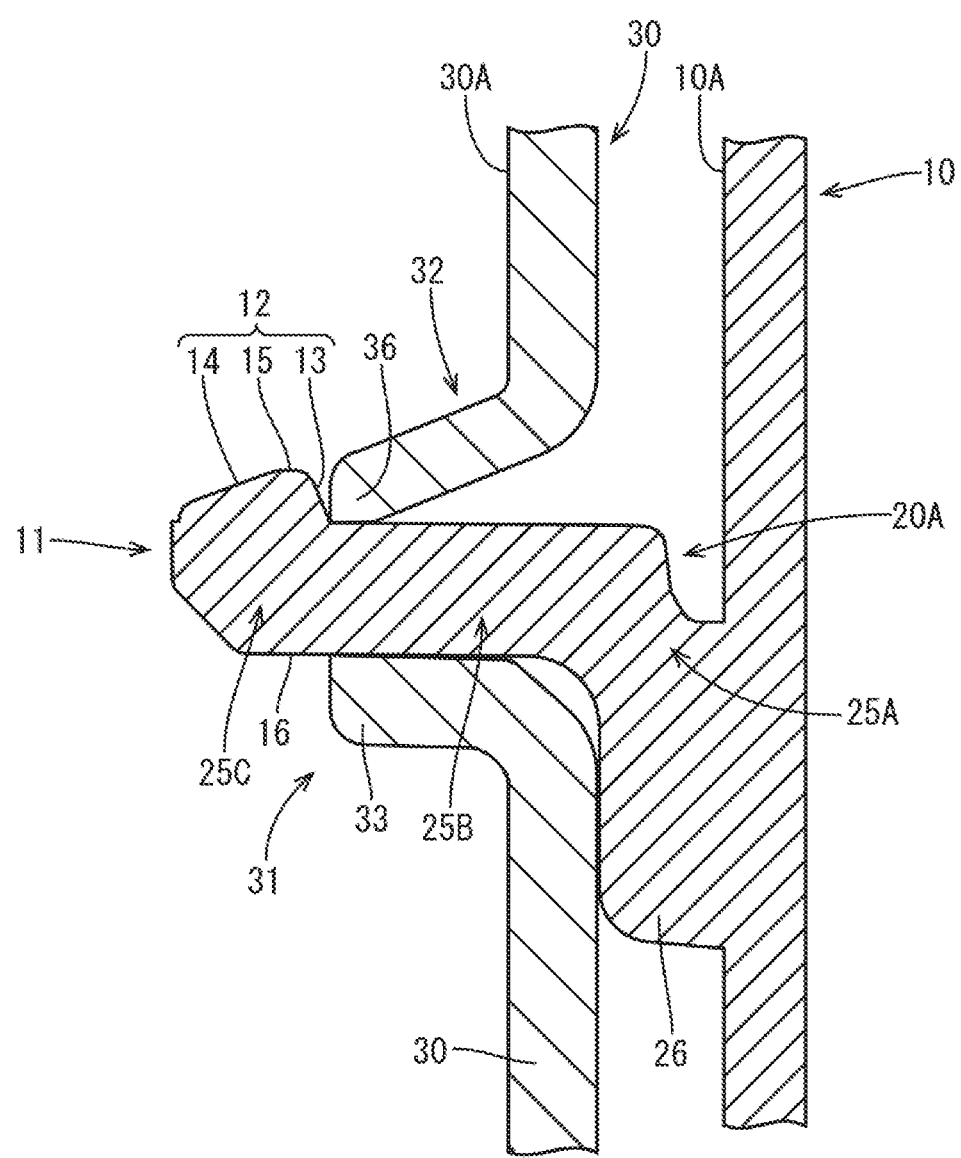
FIG. 7 is a cross-sectional view along line VII-VII in FIG. 5.

The fitting projections 11 include bodies 25, protrusions 12, first ribs 27, second ribs 28, and third ribs 26. Each fitting projection 11 includes two first ribs 27, two second ribs 28, and two third ribs 26. The bodies 25 protrude from the back surface 10A toward the ornament 30 (in the Z-axis direction). As illustrated in FIG. 7, the bodies 25 include base portions 25A, middle portions 25B and distal end portions 25C. The base portions 25A are located between the back surface 10A and the ornament 30. The middle portions 25B are disposed in the receiving spaces 34. The distal end portions 25C are disposed outside the receiving spaces 34 and away from the back surface 10A. As illustrated in FIGS. 2 and 3, each fitting projection 11 includes a first surface 17 (a fitting portion opposed surface), two second surfaces 18, a third surface 16 (a supporting portion opposed surface), and the protrusion 12. As illustrated in FIG. 7, when the each fitting projection 11 is inserted in the receiving space 34, a section of the first surface 17 in the middle portion 25B is opposed to the fitting portions 32 and a section of the third surface 16 in the middle portion 25B is opposed to the supporting portions 33. The second surfaces 18 are located between edges of the first surface 17 and the third surface 16 extending in the Z-axis direction. Each protrusion 12 protrude from a section of the first surface 17 in the distal end portion 25C. Each fitting projection 11 includes a recess 20A between the protrusion 12 and the back surface 10A (the base portion 25A and the middle portion 25B). The recess 20A are recessed from the first surface 17 toward the third surface 16. The distal end portion of each fitting projection 11 includes a recess 20B that is recessed from the first surface 17 toward the third surface 16.

As illustrated in FIGS. 2 to 4, 7 and 9, each fitting projection 11 includes two first ribs 27, two second ribs 28, and two third ribs 26. Each first rib 27 has a plate shape that projects from a section of the first surface 17 in the base portion 25A. The first rib 27 is connected with the back surface 10A. Each second rib 28 has a plate shape that protrudes from a section of the corresponding second surface 18 closer to the back surface 10A in the X-axis direction (a direction perpendicular to the protruding direction in which the fitting projection 11 protrudes and a direction which the fitting portion 32 and the supporting portion 33 are separated from each other). The second rib 28 is connected with the back surface 10A. Each third rib 26 has a plate shape that protrudes from a section of the third surface 16 closer to the back surface 10A. The third rib 26 is connected with the back surface 10A.

Figure 8:
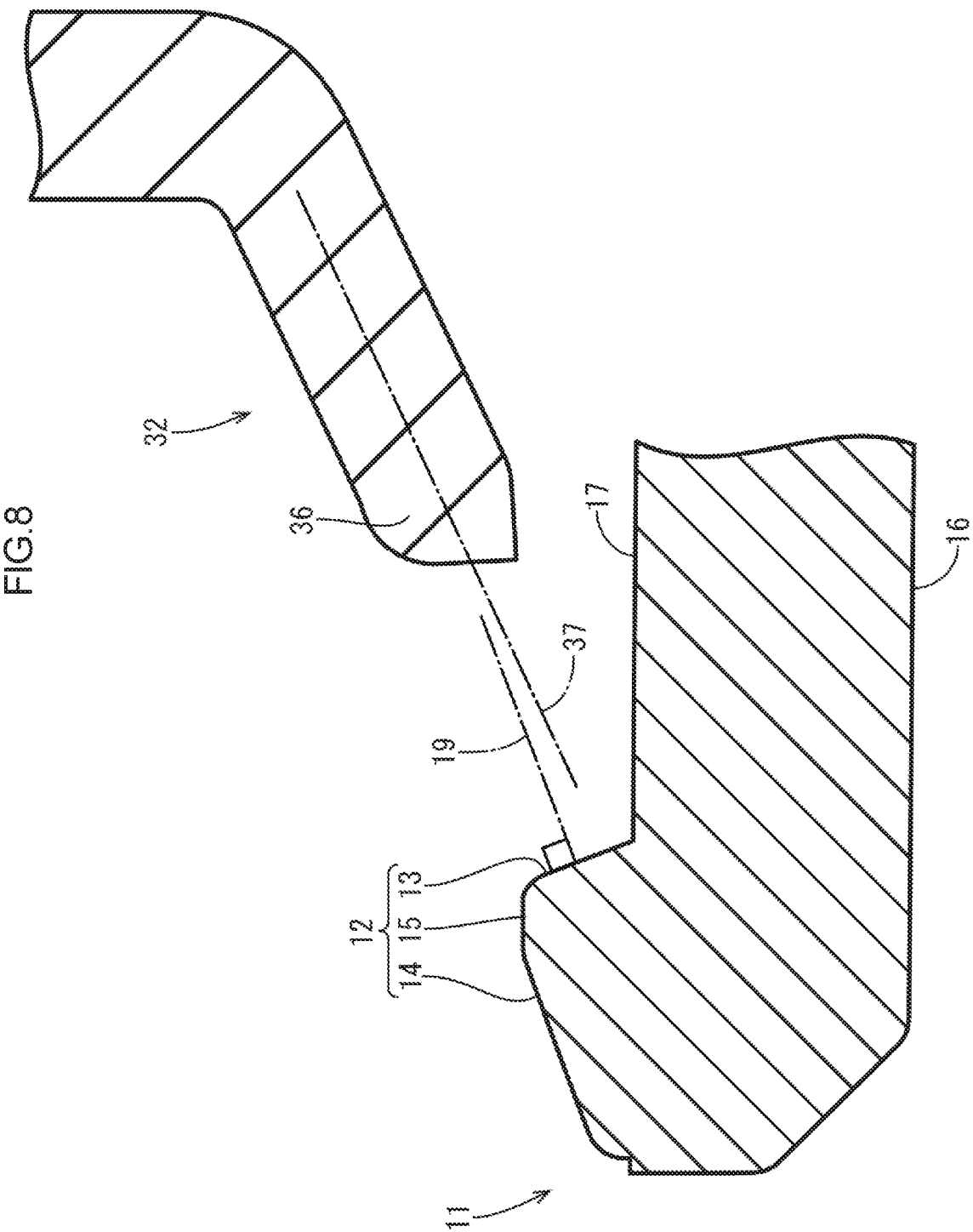
FIG. 8 is an explanatory view illustrating an axis of a fitting portion along a direction in which the fitting portion protrudes.
Figure 9:
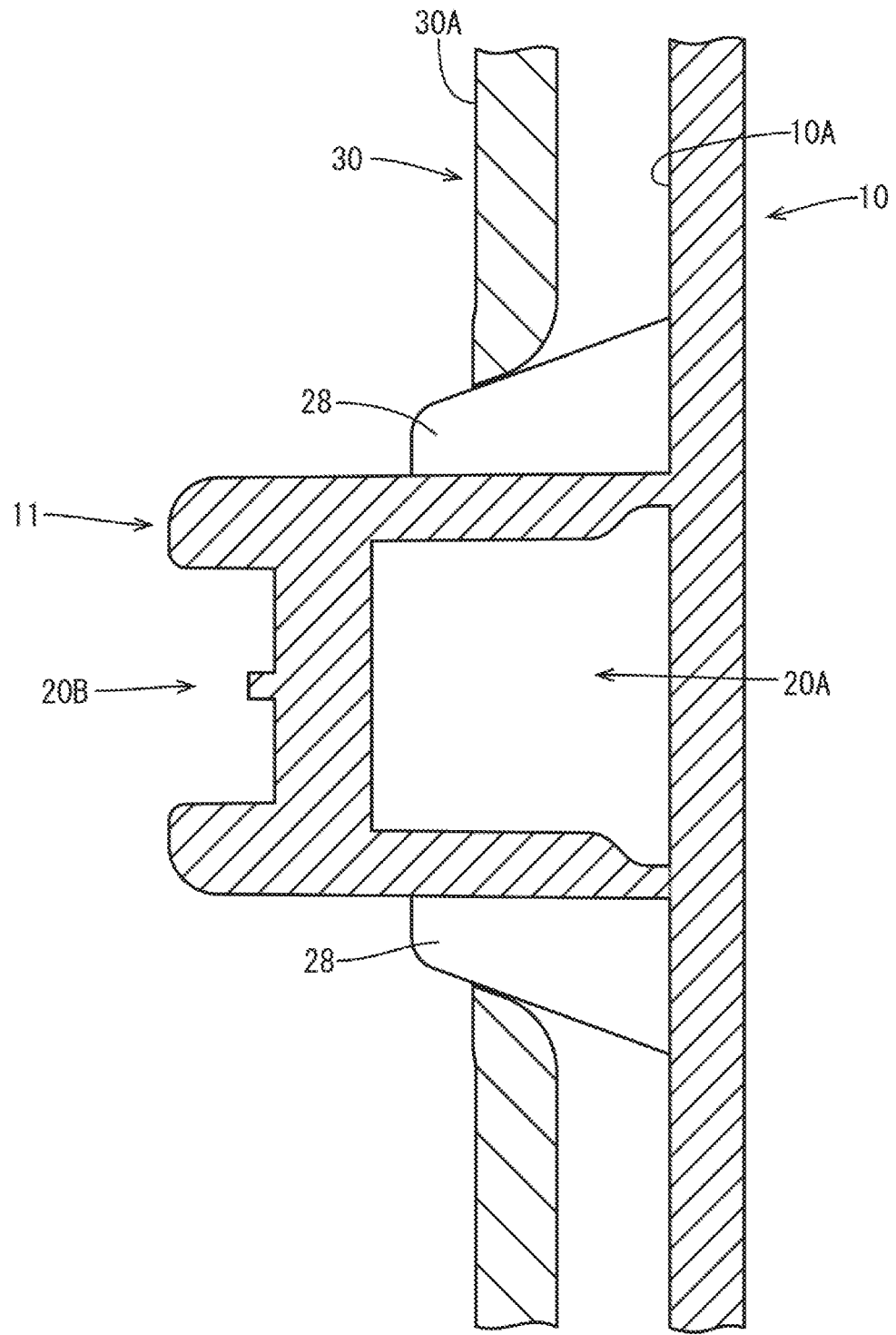
FIG. 9 is a cross-sectional view along line IX-IX in FIG. 5.

As illustrated in FIGS. 3 and 8, the protrusions 12 include first sloped surfaces 13 (contact surfaces), second sloped surfaces 14, and top surfaces 15. The top surfaces 15 are surfaces of vertexes of the protrusions 12. The top surfaces 15 extend in the X-axis direction. The top surfaces 15 include first edges and second edges that are separated front each other in the Z-axis direction (the protruding direction in which the fitting projections 11 protrude). The first sloped surfaces 13 are sloped front the first edges closer to the back surface 30A on the back of the top surfaces 15 toward the first surfaces 17. The second sloped surfaces 14 are sloped from the second edges away from the back surface 30A toward the first surfaces 17 and the distal ends of the fitting projections 11. FIG. 8 is a vertical diagram illustrating the fitting portion 32 separated from the first sloped surface 13 in a direction along an axis 37 for describing a relation between the axis 37 of the fitting portion 32 in the protruding direction and a normal line 19 normal to the first sloped surface 13 when each fitting portion 32 is in contact with the first sloped surface 13 (see FIGS. 6 and 7). The axis 37 is angled relative a direction of the normal line 19 to the first surface 17 such that the distal end of the fitting portion 32 is closer to the first surface 17 in comparison to the base of the fitting portion 32. An angle of the axis 37 relative normal line 19 may be about one degree.

As illustrated in FIG. 1, the fitting projections 11 are inserted into the receiving spaces 34 of the receptacles 31 to attach the ornament 30 to the door trim 10. As illustrated in FIGS. 2 and 7, a distance between an inner surface of each fitting portion 32 and an inner surface of the corresponding supporting portion 33 in the Y-axis direction is smaller than a distance between the third surface 16 of the fitting projection 11 and the top surface 15 of the protrusion 12. During insertion of the fitting projection 11 into the receptacle 31, the fitting projection 11 approaches the receiving space 34 while pushing up the fitting portion 32 with the second sloped surface 14. The fitting projection 11 receives a repulsion force in a direction from the fitting portion 32 to the supporting portion 33. Because the third surface 16 is supported by the supporting portion 33, the fitting projection 11 can push up the fitting portion 32 while withstanding the repulsion force.

Figure 6:
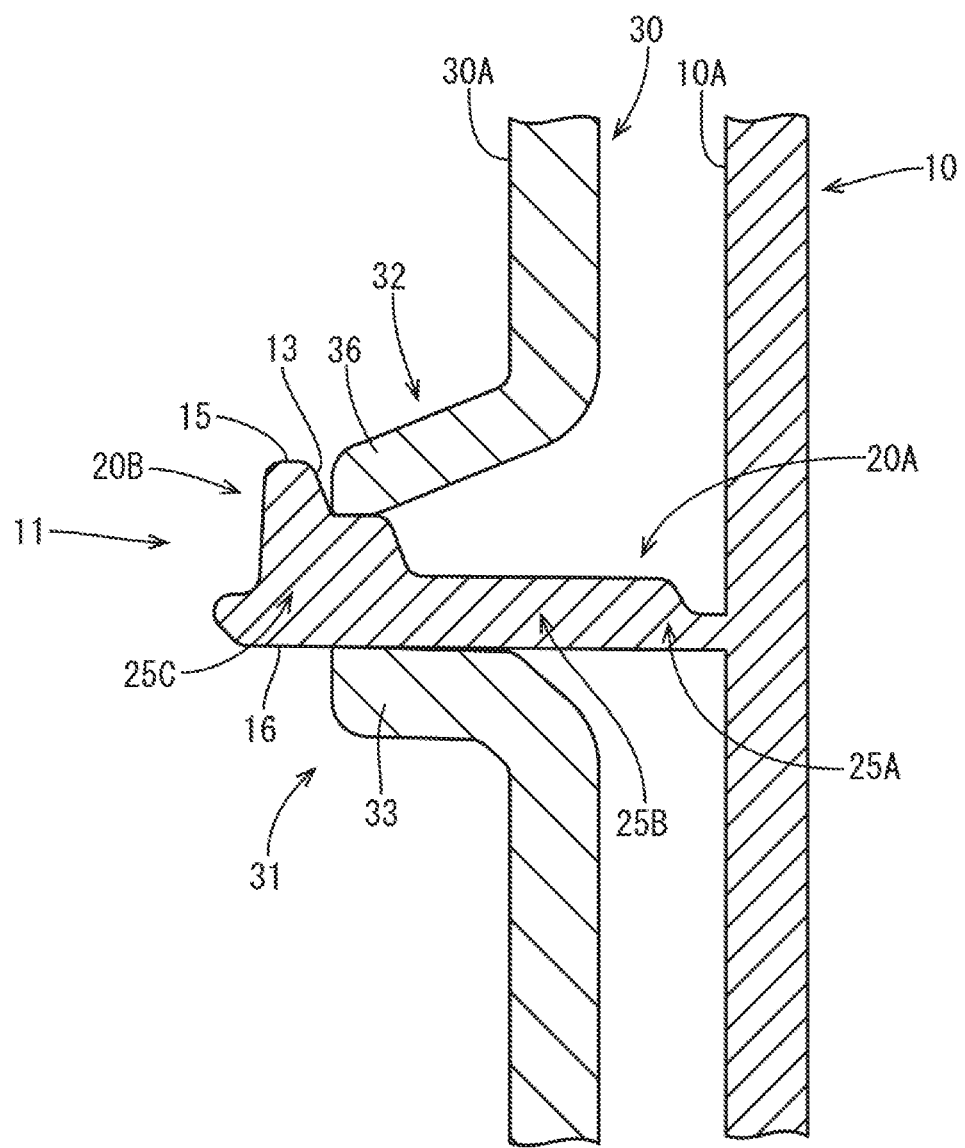
FIG. 6 is a cross-sectional view along line VI-VI in FIG. 5.

When the fitting projection 11 is pushed until the protrusion 12 goes over the distal end 36, the fitting portion 32 is recovered from elastic deformation and the first sloped surface 13 is fitted to the distal end 36 as illustrated in FIGS. 5 to 7. Namely, the fitting projection 11 is fitted to the fitting portion 32. This state, in which the fitting projection 11 is fitted to the fitting portion 32, may be referred to a fitted state. When the fitting projection 11 and the fitting portion 32 are in the fitted state, the ornament 30 is attached to the door trim 10. When the fitting projection 11 and the fitting portion 32 are in the fitted state, the third ribs 26 contact the ornament 30. Therefore, the fitting projection 11 is properly positioned relative to the receptacle 31 and thus the fitting state in which the fitting projection 11 and the distal end 36 are fitted is stably maintained.

Next, effects of this embodiment will be described. The fitting portions 32 are separated from the supporting portions 33 by the slits 35. Therefore, when the fitting portions 32 are pushed up by the fitting projections 11 that are inserted into the receiving spaces 34, the fitting portions 32 are more likely to be warped so that the receiving spaces 34 expand. According to the configuration, in comparison to a fitting structure including receptacles without slits 35, smaller forces are required for inserting the fitting projections 11 into the receiving spaces 34. Because the fitting portions 32 are separated from the supporting portions 33, the fitting portions 32 can be tilted toward the supporting portions 33. According to the configuration, even if forces to remove the fitting projections 11 from the receiving spaces 34 are exerted when the fitting projections 11 and the fitting portions 32 are in the fitted state, the fitting projections 11 are less likely to be removed from the receiving spaces 34. In comparison to the known fitting structure, the ornament 30 is less likely to be removed from the door trim 10. Furthermore, it is not necessary to increase dimensions of the fitting projections 11 from the back surface 10A and dimensions of the receptacles 31 from the back surface 30A or widths of the fitting projections 11 for enhancing the fitting structure for easy insertion or removal of the fitting projections 11. In comparison to the known fitting structure, the fitting structure is provided in a smaller size. Such a fitting structure can be used in small spaces.

If the fitting projections 11 that are fitted to the fitting portions 32 are pulled, forces may be applied to the distal ends 36 to get closer to the supporting portions 33, that is, the distal ends 36 may be pushed toward the supporting portions 33. Therefore, the distal ends 36 are less likely to slide on the first sloped surfaces 13 and thus the fitting projections 11 are less likely to be removed from the receiving spaces 34. According to the fitting structure, the ornament 30 is further less likely to be removed from the door trim 10.

The third ribs 26 are not provided in sections of the third surfaces 16 in the middle portions 25B. When the fitting projections 11 and the fitting portions 32 are in the fitted state, the sections of the third surfaces 16 in the middle portions 25B contact the supporting portions 33. If the third ribs 26 are provided in the sections of the third surfaces 16 in both the base portions 25A and the middle portions 25B, the supporting portions 33 may be scratched by the third ribs 26 during insertion of the fitting projections 11 into the receiving spaces 34. Because the third ribs 26 in this embodiment are provided only in the sections of the third surfaces 16 in the base portions 25A, such a problem is less likely to occur. Furthermore, the sections of the third surfaces 16 in the middle portions 25B contact the supporting portions 33, frictional forces are increased and thus the fitting projections 11 are further less likely to be removed from the receiving spaces 34. Still furthermore, because the third ribs 26 are provided in the sections of the third surfaces 16 in the base portions 25A, the base portions 25A of the fitting projections 11 are less likely to be broken because of the repulsion forces applied by the fitting portions 32 during the insertion of the fitting projections 11 into the receiving spaces 34.

Second Embodiment

Figure 10:
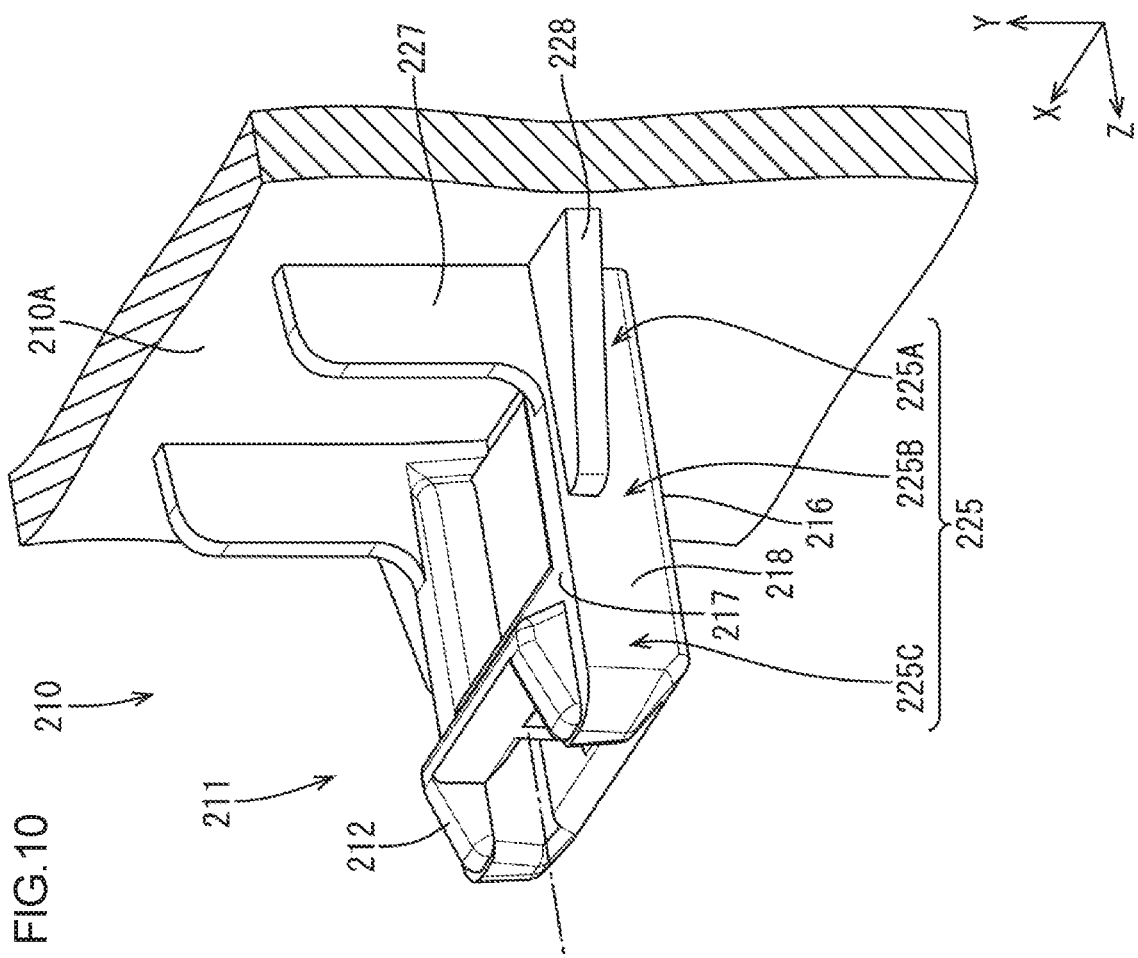
FIG. 10 is a perspective view illustrating a fitting projection and a receptacle according to a second embodiment.

The second embodiment will be described with reference to FIG. 10. A fitting structure in this embodiment includes fitting projections 211 and receptacles 231 having configurations different from those of the fitting projections 11 and the receptacles 31 in the first embodiment. Configuration, functions, and effects similar to those of the first embodiment may not be described.

The receptacles 231 of an ornament 230 (a second member) include fitting portions 232, supporting portions 233, receiving spaces 234, slits 235, and connecting portions 240. Each receptacle 231 includes two slits 235 and two connecting portions 240. Each fitting portion 232 has a plate shape that protrudes from a back surface 230A (an opposite surface). The fitting portions 232 include base portions and distal ends 236. The base portions are connected with the back surface 230A. The distal ends 236 are located on an opposite side from the base portions. The distal ends 236 include edges of the fitting portions 232 at ends in a protruding direction in which the fitting portions 232 protrude. Each supporting portion 233 has a U shape that is long in the horizontal direction. The supporting portion 233 protrudes from the back surface 230A in the Z-axis direction such that at least a section of an inner surface of the supporting portion 233 is opposed to an inner surface of the corresponding fitting portion 232. The fitting portion 232 is separated from the corresponding fitting portion 232 in the Y-axis direction. The fitting portion 232 is sloped such that the distal end 236 is more adjacent to the supporting portion 233 in comparison to the base portion. The receiving spaces 234 are defined by the fitting portion 232 and the supporting portions 233. The supporting portions 233 define halves of the receiving spaces 234. The fitting portions 232 include first edges and second edges that extend in the protruding direction in which the fitting portions 232 protrude. The slits 235 are provided between the first edges and edges of the supporting portions 233 adjacent to the first edges and between the second edges and edges of the supporting portions 233 adjacent to the second edges. The slits 235 communicate with the receiving spaces 234. One of the connecting portions 240 of each receptacle 231 protrudes from the back surface 230A of the ornament 230 to connect the first edge of the fitting portion 232 to the edge of the supporting portion 233 adjacent to the first edge. The other connecting portion 240 protrudes from the back surface 230A of the ornament 230 to connect the second edge of the fitting portion 232 to the edge of the supporting portion 233 adjacent to the second edge. A dimension of each connecting portion 240 from the back surface 230A is smaller than a dimension of the fitting portion 232 from the back surface 230A and a dimension of the supporting portion 233 from the back surface 230A.

By adjusting the dimension of each connecting portion 240 from the back surface 230A in the Z-axis direction, a degree of elastic deformation of the fitting portion 232 in the Y-axis direction can be adjusted. Therefore, a balance between an insertion force for inserting the fitting projection 211 into the receiving space 234 and a holding force for holding the fitting projection 211 and the fitting portion 232 in the fitted state can be adjusted.

The fitting projections 211 of the door trim 210 include bodies 225, first ribs 227, and second ribs 228. Each fitting projection 211 includes two first ribs 227 and two second ribs 228. The bodies 225 include base portions 225A, middle portions 225B, and distal end portions 225C similar to the base portions 25A, the middle portions 25B, and the distal end portions 25C of the bodies 25 in the first embodiment. Each body 225 includes a first surface 217 (a fitting portion opposed surface), two second surfaces 218, and a third surface 216 (a supporting portion opposed surface). Each fitting projection 211 includes a protrusion 212 having a configuration similar to that of the protrusion 12 in the first embodiment. The protrusion 212 protrudes from a section of the first surface 217 in the distal end portion 225C. Each first rib 227 has a plate shape that protrudes from a section of the first surface 217 in the base portion 225A. The first rib 227 is connected with the back surface 210A (a second member opposed surface). Each second rib 228 has a plate shape that protrudes from the second surface 218 in the X-axis direction. The second rib 228 is connected with the back surface 210A.

According to the configuration, the supporting portions 233 are further less likely to be scratched during insertion of the fitting projection 211 into the receiving spaces 234 in comparison to the first embodiment. Because the first ribs 227 and the second ribs 228 reinforce the base portions 225A of the fitting projections 211, the base portions 225A of the fitting projections 211 are less likely to be broken because of repulsion forces applied by the fitting portions 232 during the insertion of the fitting projections 211 into the receiving spaces 234. The first ribs 227 contact the ornament 230 when the fitting projections 211 and the fitting portions 232 are in the fitted state. Therefore, the fitting projections 211 are held at proper positions relative to the receptacles 231 and thus the fitting projections 211 and the fitting portions 232 are stably maintained in the fitted state.

Third Embodiment

The third embodiment will be described with reference to FIGS. 11 and 12. A fitting structure according to this embodiment includes fitting projections 311 and receptacles 331 having configurations different from the configurations of the fitting projections 11 and the receptacles 31 in the first embodiment or the configurations of the fitting projections 211 and the receptacles 231. Configuration, functions, and effects similar to those of the first embodiment and the second embodiment may not be described.

Figure 11:
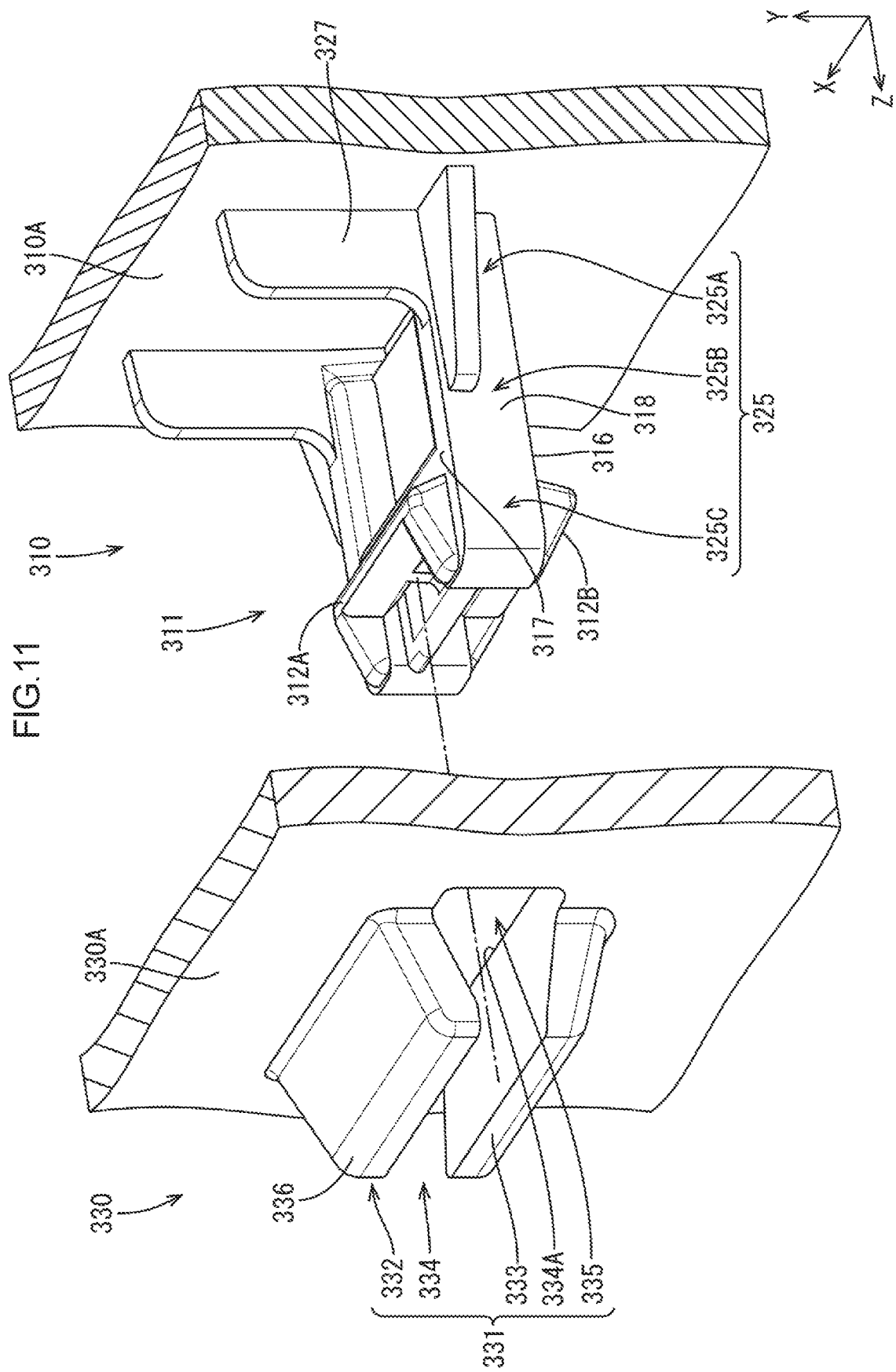
FIG. 11 is a perspective view illustrating a fitting projection and a receptacle according to a third embodiment.

As illustrated in FIG. 11, the fitting projections 311 of a door trim 310 (a first member) project from a back surface 310A of the door trim 310 (a second member opposed surface). The fitting projections 311 include bodies 325, protrusions (first protrusions 312A and second protrusions 312B), first ribs 327, and second ribs 328. Each fitting projection 311 includes two protrusions (one first protrusion 312A and one second protrusion 312B), two first ribs 327, and two second ribs 328. The bodies 325 include base portions 325A, middle portions 325B, and distal end portions 325C having configurations similar to the configurations of the base portions 25A, the middle portions 25B, and the distal end portions 25C of the bodies 25 in the first embodiment. Each body 325 includes a first surface 317 (a fitting portion opposed surface), two second surfaces 318, a third surface 316 (a supporting portion opposed surface). Each first protrusion 312A protrudes from a section of the first surface 317 in the distal end portion 325C. Each second protrusion 312B protrudes from a section of the third surface 316 in the distal end portion 325C.

The receptacles 331 of an ornament (a second member) include fitting portions 332, supporting portions 333, receiving spaces 334, and slits 335. Each receptacle 331 includes two slits 335. Each fitting portion 332 has a plate shape that protrudes from a back surface 330A (an opposite surface). Each fitting portion 332 includes a first distal end 336. Each supporting portion 333 has a plate shape that protrudes from the back surface 330A such that at least a section of an inner surface of the supporting portion 333 is opposed to an inner surface of the corresponding fitting portion 332. Each receiving space 334 is defined by the corresponding fitting portion 332 and the corresponding supporting portion 333. The ornament 330 includes through holes 334A at positions corresponding to the receiving spaces 334. The through holes 334A are openings through which the fitting projections 311 are inserted into the receiving spaces 334. The fitting portions 332 and the supporting portions 333 are sloped relative to the Z-axis direction such that a distance between each first distal end 336 and the corresponding second distal end 337 in the Y-axis direction is smaller than a dimension of the corresponding through hole 334A in the Y-axis direction. The fitting portions 332 include first edges and second edges that extend in a protruding direction in which the fitting portions 332 protrude. The slits 335 are provided between the first edges and edges of the supporting portions 333 adjacent to the first edges and between the second edges and edges of the supporting portions 333 adjacent to the second edges. The slits 335 communicate with the receiving spaces 334.

Figure 12:
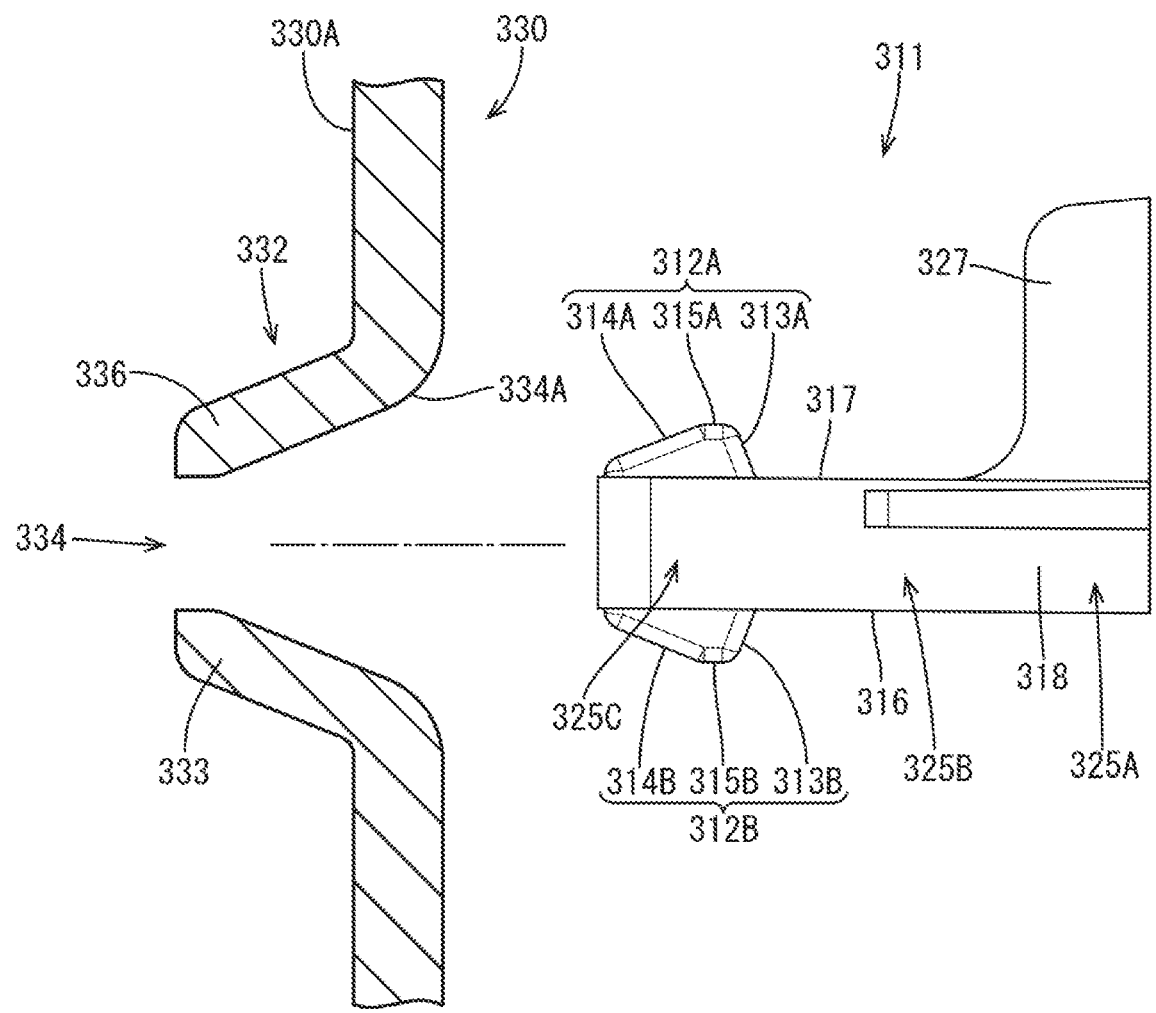
FIG. 12 is a view illustrating a relation between the fitting projection and the receptacle before fitting according to the third embodiment.

As illustrated in FIG. 12, the first protrusions 312A includes a first sloped surface 313A (a contact surface), a second sloped surface 314A (a contact surface), and a top surface 315A. The top surface 315A includes a first edge and a second edge that are separated from each other in a protruding direction in which the fitting projection 311 protrudes. The first sloped surface 313A is sloped from the first edge of the top surface 315A toward the first surface 317. The second sloped surface 314A is sloped from the second edge of the top surface 315A toward the first surface 317 and the distal end of the fitting protrusion 311. Each second protrusion 312B includes a first sloped surface 313B (a contact surface), a second sloped surface 314B, and a top surface 315B. The top surface 315B includes a first edge and a second edge that are separated from each other in the protruding direction in which the fitting projection 311 protrudes. The first sloped surface 313B is sloped from the first edge of the top surface 315B toward the first surface 317. The second sloped surface 314B is sloped from the second edge of the top surface 315B toward the first surface 317 and the distal end of the fitting projection 311. Namely, when the fitting projection 311 is viewed from one of second surface 318 sides, a top of the fitting projection 311 has an arrowhead shape.

According to the fitting projections 311 having such a configuration, each fitting portion 332 and the corresponding supporting portion 333 slope toward each other. During insertion of the fitting projections 311 into the receiving spaces 334, when each first protrusion 312A and each second protrusion 312B are pushed over the first distal end 336 and the second distal end 337, the fitting portions 332 and the supporting portions 333 are recovered from elastic deformation. As a result, the first sloped surface 313A of each first protrusion 312A is fitted to the first distal end 336 and the first sloped surface 313B of each second protrusion 312B is fitted to the second distal end 337. When the fitting projections 311 are fitted to the fitting portions 332 (in the fitted state) and forces to remove the fitting projections 311 from the receiving spaces 334 are applied, the fitting portions 332 and the supporting portions 333 further slope toward each other. Therefore, the fitting projections 311 are less likely to be removed from the receiving spaces 334.

Other Embodiments

The technology described herein is not limited to the embodiments described above and with reference to the drawings. The following embodiments may be included in the technical scope. Further, the configurations may be altered without departing from the technical scope.

(1) The shapes of the supporting portions 33, 233, and 333 may be altered where appropriate. As long as the slits 35, 235, or 335 are provided between the supporting portions 33, 233, or 333 and the fitting portions 32, 232, or 332, the supporting portions 33, 233, and 333 can be formed in any shapes.

(2) Combinations of the receptacles 31, 231, and 331 and the fitting projections 11, 211, and 311 may be altered where appropriate. For example, a fitting structure may have a configuration including a combination of the fitting projections 11 that include the first ribs 27, the second ribs 28, and the third ribs 26 in the first embodiment and the receptacles 231 that include the connecting portions 240 in the second embodiment.

(3) The technology described herein may be applied to the fitting structures for fitting of components in other types of transportation such as trans, amusement park rides, airplanes, helicopters, boats, ships, and submarines.

EXPLANATION OF SYMBOLS

1: Vehicle door, 2: Door panel, 10, 210, 310: (First member), 10A, 210A, 310A: Back surface (Second member opposed surface), 11, 211, 311: Fitting projection, 12, 212, 312: Protrusion, 13, 313A, 313B: First sloped surface, 14, 314A, 314B: Second sloped surface, 15, 315A, 315B: Top surface, 16, 216, 316: Third surface (Supporting portion opposed surface), 17, 217, 317: First surface (Fitting portion opposed surface), 18, 218, 318: Second surface, 19: Normal line, 20: Recess, 25, 225, 325: Body, 25A, 225A, 325A: Base portion, 25B, 225B, 325B: Middle portion, 25C, 225C, 325C: Distal end, 26: Third rib, 27, 227, 327: First rib, 28, 228, 328: Second rib, 30, 230, 330: Ornament (Second member), 30A, 230A, 330A: Back surface (Opposite surface), 31, 231, 331: Receptacle, 32, 232, 332: Fitting portion, 33, 233, 333: Supporting portion, 34, 234, 334: Receiving space, 35, 235, 335: Slit, 36, 236: Distal end, 336: First distal end, 337: Second distal end, 37: Axis, 240: Connecting portion

The invention claimed is:

1. A fitting structure for fitting a first member and a second member together, the fitting structure comprising:
a fitting projection protruding from a second member opposed surface of the first member opposed to the second member toward the second member;
a receptacle protruding from an opposite surface of the second member on an opposite side from the second member opposed surface in an opposite direction from the second member opposed surface, the receptacle including an internal receiving space communicating with a through hole in the second member, the receptacle including:
a fitting portion having a plate shape protruding from the opposite surface;
a supporting portion protruding from the opposite surface such that at least a section of an inner surface of the supporting portion is opposed to an inner surface of the fitting portion; and
two slits provided between two edges of the fitting portion extending in a protruding direction in which the fitting portion protrudes and edges of the supporting portion adjacent to the two edges of the fitting portion, respectively, the slits communicating with the receiving space that is defined by the fitting portion and the supporting portion, wherein
the fitting projection includes a first section disposed in the receiving space and a second section fitted to the fitting portion, the fitting projection including
a body having a fitting portion opposed surface being along a protruding direction in which the fitting projection protrudes and opposed to the fitting portion and a supporting portion opposed surface being along the protruding direction and opposed to the supporting portion and an opposite surface from the fitting portion opposed surface; and
a rib protruding from the supporting portion opposed surface along the second member opposed surface and connected with the second member opposed surface.

2. The fitting structure according to claim 1, wherein the fitting portion is sloped toward the supporting portion.

3. The fitting structure according to claim 2, wherein
the fitting portion includes a distal end,
the fitting projection includes a protrusion protruding from the fitting portion opposed surface and fitting to the distal end,
the protrusion including a contact surface contacting the distal end,
the fitting portion is provided such that an axis of the fitting portion being along the protruding direction in which the fitting portion protrudes is angled relative to a direction of a normal to the contact surface that contacts the distal end, and
the axis is angled such that the distal end of the fitting portion is more adjacent to the fitting portion opposed surface in comparison to a base of the fitting portion.

4. The fitting structure according to claim 1, wherein
the supporting portion opposed surface includes a first section contacting the supporting portion and a second section located between the first section and the second member opposed surface, and
the rib protrudes from the second section of the supporting portion opposed surface.

5. The fitting structure according to claim 1, wherein
the body of the fitting projection further has a side surface that extends from the fitting portion opposed surface to the supporting portion opposed surface, and the fitting projection further includes a side rib protruding from the side surface in a direction along the second member opposed surface and connected with the second member opposed surface.

6. The fitting structure according to claim 1, wherein the fitting projection includes:
a base portion disposed between the second member opposed surface and the second member;
a middle portion disposed inside the receiving space;
a distal end portion disposed outside the receiving space; and
a first rib protruding from a section of the fitting portion opposed surface in the base portion and connected with the second member opposed surface.

7. The fitting structure according to claim 1, wherein the fitting portion includes a distal end,
the fitting projection includes a protrusion protruding from the fitting portion opposed surface and fitting to the distal end,
the protrusion includes a top surface that is a surface of a vertex,
the top surface includes a first edge and a second edge separated from each other in the protruding direction in which the fitting projection protrudes,
the contact surface is a first sloped surface sloped from the first edge of the top surface toward the fitting portion opposed surface, and
the protrusion includes a second sloped surface sloped from the second edge of the top surface toward the fitting portion opposed surface and a distal end of the fitting projection.

8. The fitting structure according to claim 7, wherein a distance between the inner surface of the distal end of the fitting portion and the inner surface of a distal end of the supporting portion is smaller than a dimension of the fitting projection from the supporting portion opposed surface to the top surface.

9. The fitting structure according to claim 1, wherein the receptacle further includes two connecting portions protruding from the opposite surface and connecting sections of the edges of the fitting portion to sections of the edges of the supporting portion adjacent to the edges of the fitting portion, and
the connecting portions have dimensions smaller than a dimension of the fitting portion from the opposite surface and a dimension of the supporting portion from the opposite surface.

10. The fitting structure according to claim 1, wherein the fitting projection includes:
a base portion disposed between the second member opposed surface and the second member;
a middle portion disposed inside the receiving space;
a distal end portion disposed outside the receiving space;
a first protrusion protruding from a section of the fitting portion opposed surface in the distal end portion of the fitting projection and being fitted to a first distal end of the fitting portion; and
a second protrusion protruding from a section of the supporting portion opposed surface in the distal end portion and being fitted to a second distal end of the support portion.

11. The fitting structure according to claim 10, wherein the fitting projection includes a rib protruding from a section of the fitting portion opposed surface in the base portion of the fitting projection and being connected with the second member opposed surface.

12. The fitting structure according to claim 10, wherein the first protrusion includes a top surface that is a surface of a vertex of the first protrusion,
the top surface of the first protrusion includes a first edge and a second edge separated from each other in the protruding direction in which the fitting projection protrudes,
the first protrusion includes a first sloped surface sloped from the first edge of the top surface of the first protrusion toward a section of the fitting portion opposed surface in the middle portion,
the first protrusion includes a second sloped surface sloped from the second edge of the top surface of the first protrusion toward the fitting portion opposed surface and a distal end of the fitting projection,
the first sloped surface of the first protrusion contacts a first distal end of the fitting portion,
the second protrusion includes a top surface that is a surface of a vertex of the second protrusion,
the top surface of the second protrusion includes a first edge and a second edge separated from each other in the protruding direction in which the fitting projection protrudes,
the second protrusion includes a first sloped surface sloped from the first edge of the top surface of the second protrusion toward a section of the supporting portion opposed surface in the middle portion,
the second protrusion includes a second sloped surface sloped from the second edge of the top surface of the second protrusion toward the supporting portion opposed surface and the distal end of the fitting projection, and
the first sloped surface of the second protrusion contacts a second distal end of the supporting portion.

13. A fitting structure for fitting a first member and a second member together, the fitting structure comprising:
a fitting projection protruding from a second member opposed surface of the first member opposed to the second member toward the second member;
a receptacle protruding from an opposite surface of the second member on an opposite side from the second member opposed surface in an opposite direction from the second member opposed surface, the receptacle including an internal receiving space communicating with a through hole in the second member, the receptacle including:
a fitting portion having a plate shape protruding from the opposite surface;
a supporting portion protruding from the opposite surface such that at least a section of an inner surface of the supporting portion is opposed to an inner surface of the fitting portion; and
two slits provided between two edges of the fitting portion extending in a protruding direction in which the fitting portion protrudes and edges of the supporting portion adjacent to the two edges of the fitting portion, respectively, the slits communicating with the receiving space that is defined by the fitting portion and the supporting portion, wherein
the fitting projection includes a first section disposed in the receiving space and a second section fitted to the fitting portion,
the fitting projection including
a body having a fitting portion opposed surface being along a protruding direction in which the fitting projection protrudes and opposed to the fitting portion, a supporting portion opposed surface being along the protruding direction and opposed to the supporting portion and an opposite surface from the fitting portion opposed surface, and a side surface that extends from the fitting portion opposed surface to the supporting portion opposed surface; and a side rib protruding from the side surface in a direction along the second member opposed surface and connected with the second member opposed surface.

14. The fitting structure according to claim 13, wherein the side rib extends from the second member opposed surface in the protruding direction and protrudes further from the opposite surface in the protruding direction.

15. The fitting structure according to claim 13, wherein the fitting projection and the fitting portion are in a fitted state when the fitting projection is inserted in the through hoe and the first section of the fitting projection is disposed in the receiving space and the second section is fitted to the fitting portion, and the side rib is in contact with a hole edge of the through hole when the fitting projection and the fitting portion are in the fitted state.

16. The fitting structure according to claim 15, wherein the side rib extends from the second member opposed surface in the protruding direction and has an extended end, and a hole inner surface of the through hole is sloped such that as a thickness of a body member of the second member including the through hole decreases as the hole inner surface extends toward the opposite surface.

17. The fitting structure according to claim 13, wherein the side rib extends from the second member opposed surface in the protruding direction and has an extended end, and the extended end has a chamfered shape.

18. The fitting structure according to claim 13, wherein the side rib protrudes from a section of the side surface of the fitting projection and the section of the side surface is closer to the fitting portion opposed surface.

19. The fitting structure according to claim 13, the fitting portion includes a distal end, and the fitting projection includes a protrusion protruding from the fitting portion opposed surface and the protrusion fitting to the distal end when the fitting projection and the fitting portion are in the fitted state.

20. The fitting structure according to claim 13, wherein the fitting projection includes:

a base portion disposed between the second member opposed surface and the second member;

a middle portion disposed inside the receiving space;

a distal end portion disposed outside the receiving space; and a first rib protruding from a section of the fitting portion opposed surface in the base portion and connected with the second member opposed surface.

* * * * *